July 1, 1947.　　　　W. STRAUSS　　　　2,423,268
DOUBLE-CHECKING MOLDING PRESS
Filed March 23, 1945　　　　3 Sheets-Sheet 1

Inventor
WILLIAM STRAUSS
By Ralph B. Stewart
Attorney

July 1, 1947.  W. STRAUSS  2,423,268
DOUBLE-CHECKING MOLDING PRESS
Filed March 23, 1945   3 Sheets-Sheet 2

Inventor
WILLIAM STRAUSS
By Ralph B. Stewart
Attorney

July 1, 1947.  W. STRAUSS  2,423,268
DOUBLE-CHECKING MOLDING PRESS
Filed March 23, 1945  3 Sheets-Sheet 3

Inventor
WILLIAM STRAUSS
By Ralph B. Stewart
Attorney

Patented July 1, 1947

2,423,268

UNITED STATES PATENT OFFICE 2,423,268

DOUBLE-CHECKING MOLDING PRESS

William Strauss, Philadelphia, Pa., assignor to F. J. Stokes Machine Company, a corporation of Pennsylvania Application March 23, 1945, Serial No. 584,363

16 Claims. (Cl. 192—125)

This invention relates to molding presses and it is concerned especially with devices for checking the operation of automatic molding presses to stop the press in case of improper operation. This application is a continuation-in-part of my copending application, Serial Number 515,967, filed December 28, 1943.

An object of the invention is to devise a checking device suitable for use on a multiple cavity molding press designed for general purpose molding. By the use of my invention, I am able to produce a fully automatic molding machine adapted for general purpose molding and capable of a high production rate.

One of the problems in automatic molding machines which operate without attention from an operator is the danger of mechanical injury to the machine due to double loading, that is, where a molding charge is supplied to the cavity when the molded article previously formed has not been properly ejected from the machine. A further problem is to provide for stoppage of the press when the supply of molding material becomes exhausted or is not properly supplied to the cavities.

Various devices have been devised to check the operation of automatic molding presses and stop the press in the event of certain improper conditions. For example, checking arrangements have been devised in which the molded articles after being ejected from the press are passed through a weighing device, and if the article is not of proper weight, or if the proper number of articles are not present after each molding cycle, the machine will be stopped. Such arrangements give satisfactory operation where the press is provided with only a few cavities and the weighing device is sensitive to the absence of one of the molded articles. These arrangements, however, are not sufficiently sensitive to detect the absence of one article where the press is designed to mold a large number of articles during each cycle, and are therefore not suitable for high production molding.

In molding special articles, such as screw threaded caps, the checking problem is not especially difficult, since the molded article is not likely to remain in the cavity, and it is necessary only to check the force plug after the unscrewing operation to be sure that no cap remains on the plugs during the next molding cycle.

In the case of a molding press designed for general purpose work, that is, in the case of a press designed to mold various forms of articles not necessarily involving screw threads or other projections on the mold parts which interlock with the molded articles, there is greater likelihood that some of the molded articles will not stick on the part of the mold which is intended. For example, if the articles are designed to adhere to the force plug or punch there is a possibility that some may remain in the cavities and vice versa. In order to obtain proper checking of the operation of a general purpose molding press, I have devised a checking device which checks the operation of the press twice during each molding cycle, that is, the device checks each force plug or punch immediately after opening of the press and if a molded article is absent from any force plug, the machine is stopped. The second checking operation takes place after the ejection of the molded articles from the force plugs, and if a molded article remains on any force plug the operation of the press will be stopped.

The checking devices of my invention involve an exploring device for exploring the article-carrying part of the mold, and a stopping device controlled by the exploring device for stopping the press in the event of improper operation. The exploring device involves one or more feeler elements which explore the mold part and control switches or relays in accordance with the presence or absence of a molded article. The feeler elements may be mechanical feelers having actual contact with the molded articles, or they may "feel" or sense the articles electrically without physical contact. According to the preferred form of my invention, only one set of feeler elements is employed to perform both checking operations.

My invention also involves novel arrangements for producing relative movement between the article-carrying mold part and the exploring device, and an object of the invention is to reduce to a minimum the number of moving parts required for the operation of the press. Such relative movement may be obtained either by moving the article-carrying mold part with respect to the exploring device, or by moving the exploring device with respect to the article-carrying mold part.

According to one form of my invention, it is necessary to move only one mold plate out of the press, while according to another form, both the upper and lower mold plates remain in the press. Accordingly, my invention provides a general purpose molding machine capable of high production and having fewer moving parts and being less subject to disorder than in the arrangements of the prior art.

My invention is illustrated in the accompanying drawing in which.

Figure 1:
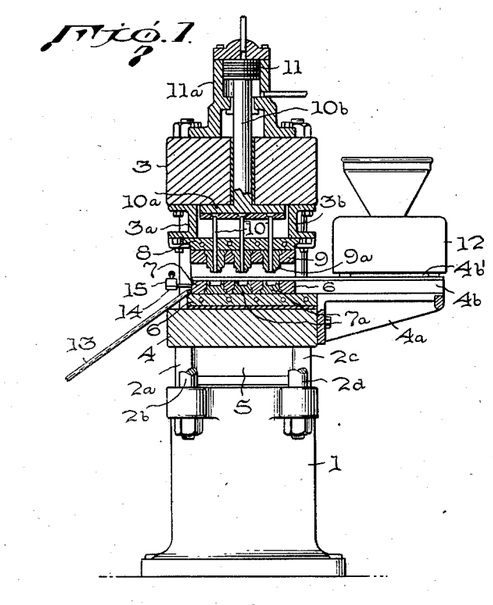
Figure 1 is a side elevational view, partly in section, illustrating one form of exploring device mounted upon the movable die plate of a multiple cavity press.

While my invention may be employed on a press operated by mechanical means, for the purpose of illustration I have shown the invention applied to a press operated by hydraulic means. Referring to Figure 1 of the drawing, the press selected for illustration comprises a base 1 having secured thereto four tension rods 2a, 2b, 2c and 2d extending upwardly and supporting at their upper ends a fixed cross head 3. A sliding crosshead 4 is guided for vertical movement by tension rods 2a to 2d and is supported on the upper end of a plunger 5 positioned in the hydraulic cylinder formed in base 1. Sliding crosshead 4 carries a heated platen 6 which in turn supports a die plate 7 carrying a plurality of die elements 7a arranged in parallel rows and columns. An upper heated platen 8 is supported beneath fixed crosshead 3 by means of a pair of channel bars 3a and 3b suitably secured to the lower face of crosshead 3. A punch plate 9 is mounted on the lower face of platen 8 and is provided with a plurality of punch elements 9a arranged to cooperate with the die elements carried by the die plate 7. Each punch element is provided with an ejecting pin 10, the pins being supported from a crosshead 10a carried by a vertically reciprocative rod 10b passing through an aperture formed in crosshead 3 and being connected with piston 11 of a hydraulic cylinder 11a mounted on top of the crosshead 3.

A bracket 4a secured to movable crosshead 4 forms an extension of the upper surface of heated platen 6 along which the die plate 7 may be moved from its operative position within the press into loading position beneath any suitable loading device 12 mounted above bracket 4a. Suitable guiding rails or bars 4b are arranged on opposite sides of die plate 7 and serve to guide the plate as it moves from one position to the other. Suitable hold-down strips 4b' are secured to the rails 4b and extend over the lateral edges of the die plate 7. Any suitable means may be provided for shifting the plate 7 from its molding position to loading position and vice versa. In actual practice, this would be done by means of a hydraulic cylinder controlled by a suitable cycle controller, but the die plate may be moved manually. The operating arrangement has not been illustrated since it forms no part of the invention.

A suitable plate or tray 13 is hinged at one end to the front edge of die plate 7 and normally occupies the position shown in Figure 1 when plate 7 is in molding position. When the die plate is moved into loading position, tray 13 is drawn into the press and into a horizontal position beneath the punches 9a so that the articles which are ejected from the punches by ejecting pins 10 will be deposited on the tray or plate. When the die plates moves back into the press, the article tray 13 moves into the inclined position shown in Figure 1 and the molded articles slide off of the tray and into a suitable receptacle not shown. The tray 13 is not essential and any other suitable means may be employed for removing the molded articles from the press after they have been ejected from the force plugs.

An exploring device is arranged to move with plate 6 and involves a horizontal bar 14 supported from the front edge of die plate 7, any suitable supporting arrangement being employed to provide for vertical adjustment of the position of the bar. A plurality of checking switches 15 carried by bar 14, one switch being provided for each column of punches carried by the punch plate 9, and the row of switches carried by the bar 14 being parallel with the rows of punches. Each switch is operated by a suitable feeler element.

Figure 2:
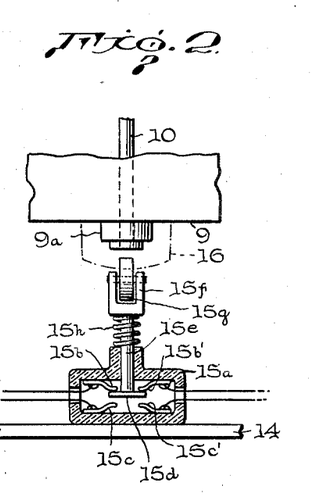
Figure 2 is an enlarged vertical sectional view of one switch element of the exploring device.

The checking switches are all alike, and one suitable arrangement is illustrated in Figure 2 which is an elevational view, partly in section, showing one switch element as viewed from the left of Figure 1. The switch structure embodies a suitable housing 15a preferably formed of insulating material and containing a pair of fixed upper contacts 15b, 15b' and a pair of lower contacts 15c, 15c'. A movable contact 15d is carried on a plunger 15e and is arranged so that by reciprocation of the plunger contact 15d will bridge the upper pair of contacts or the lower pair of contacts. Plunger 15e carries at its upper end a yoke or bifurcated head 15f in which is pivotally supported a feeler wheel 15g. Plunger 15e and the attached elements are normally held in the upper position by any suitable biasing means such as spring 15h. The connections for the upper and lower pairs of contacts are shown extending out of the casing 15a on opposite sides of the switch unit. The bar 14 is initially adjusted so that the wheel 15g will not engage the punch 9a when the die plate is moved from loading position back to molding position, but when the die plate is moved from molding position to loading position at a time when the molded article 16 is carried by the punch 9a, the feeler wheel will engage the molded article and cause depression of plunger 15e and thereby shift movable contact 15d from its upper position to the lower position where it bridges the lower pair of contacts. It will be understood that all switches carried by bar 14 are operated substantially simultaneously under normal operating conditions when the switches pass a row of punch elements each carrying a molded article.

Figure 3:
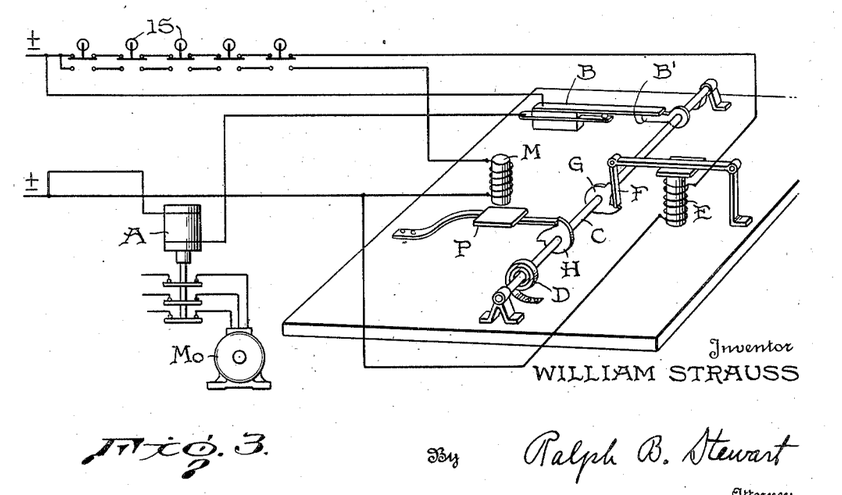
Figure 3 is a diagrammatic view showing the electric connections for the checking device and the details of a special control relay forming part of the device.

The checking switches are connected in a special control circuit diagrammatically represented in Figure 3 for controlling a power motor Mo which is the source of power for the pumps in the hydraulic system or, in the case of a mechanically operated press, the motor Mo would drive the press operating screws, cams or the like. The circuit of motor Mo is controlled by an electromagnetic switch A, the energizing circuit of which is normally completed through normally closed contacts B of a special relay forming part of the checking device of Figure 3. The checking relay involves a shaft C carrying a cam B' arranged to open contacts B when the shaft is rotated through a certain angle in a clockwise direction. The shaft is normally urged in an anti-clockwise direction by a biasing spring D, and is rotated in a clockwise direction by means of a stepping magnet E which when energized operates a pawl F which in turn engages and operates a ratchet G having two teeth. Two operations of the magnet E are required to rotate the shaft far enough to open the contacts B. The shaft is held in its first operated position by means of a second ratchet wheel H and a cooperating latch P which may be disengaged from the ratchet wheel H by releasing magnet M. A suitable stop is provided in the path of cam B' to limit the amount of backward rotation of shaft C when pawl P is released.

Magnets E and M are energized from a suitable supply circuit and are controlled by the checking switches 15 diagrammatically represented in Figure 3. As will be seen, the circuit of magnet E is completed through the upper pair of contacts of switches 15 connected in serial circuit relation, and the circuit of magnet M is completed through the lower pairs of contacts of the switches connected in serial circuit relation. Magnet E is normally energized so that shaft C is normally ratcheted around to its mid position and is held in this position by pawl P.

Operation of Figures 1 to 3 is as follows:

It will be understood that the operation of the press is controlled in any suitable manner, either manually or automatically, to execute a succession of molding cycles. I prefer to control the press automatically by suitable control means well known to those skilled in the art. As the lower die plate is moved out of the press following the compression stage of the cycle, the checking switches pass underneath the successive rows of punches or force plugs arranged transversely of the direction of movement of the die plate and parallel with the bar 14. It will be remembered that magnet E is normally energized and shaft C is held in its mid position by latch P. If all of the switches are actuated downwardly by articles on the force plugs, then the circuit to magnet M will be completed and the pawl P will be withdrawn from the ratchet H, and the shaft C will rotate back to its zero position. As soon as the switches move away from the first row of force plugs, they will all return to their upper position and magnet E will again be energized, stepping the shaft C around to its mid position. If one or more articles are not present in the next row of force plugs, one or more switches will not be operated to the lower position, and magnet M remains de-energized, and, as soon as the remaining switches are returned to their upper position, magnet E is again energized and steps the shaft C around to a position where it opens contacts B which deenergizes the power motor and stops the press.

While the die plate is in loading position charges of molding material are supplied to the cavities in plate 7, and the ejection piston 11 is operated to break the previously formed articles away from the punches.

When the die plate 7 is moved back into the press, the operation of the checking switches will be the same as before except that the power motor will be stopped if one or more molded articles remain on the force plugs. For example, if one article sticks to one of the force plugs in the back row, one of the checking switches will be operated to its lower position, while the other switches will remain in their upper positions. This will interrupt the circuit to magnet E, but the circuit to releasing magnet M remains open and the shaft C remains in its mid position. As soon as the single switch returns to its upper position, that is, as soon as the checking switch moves away from the back row of the force plugs, the circuit to magnet E is again completed and the shaft C is stepped around to the position for opening contact B and thus stops the power motor.

From the foregoing it will be seen that the checking relay which controls the circuit of power switch A constitutes a storage device which requires two consecutive operating impulses without an intervening releasing impulse in order to stop the press. So long as all checking switches are operated simultaneously, the checking relay will be supplied with alternate operating and releasing impulses, and the relay will never reach its final position for opening the circuit to the power motor. If, however, one or more switches are operated when others are not, then two operating impulses will follow each other without an intervening releasing impulse, and the relay will be stepped around to a position to open the circuit of switch A.

My invention contemplates any arrangement for alternately energizing magnets E and M by feeler devices which are operated by the molded articles carried on the punches when the die plate is moved from molding position to loading position, the arrangement being also effective to supply an additional impulse to magnet E when the die plate is moved from loading position into molding position if a molded article remains on any punch.

Figure 4:
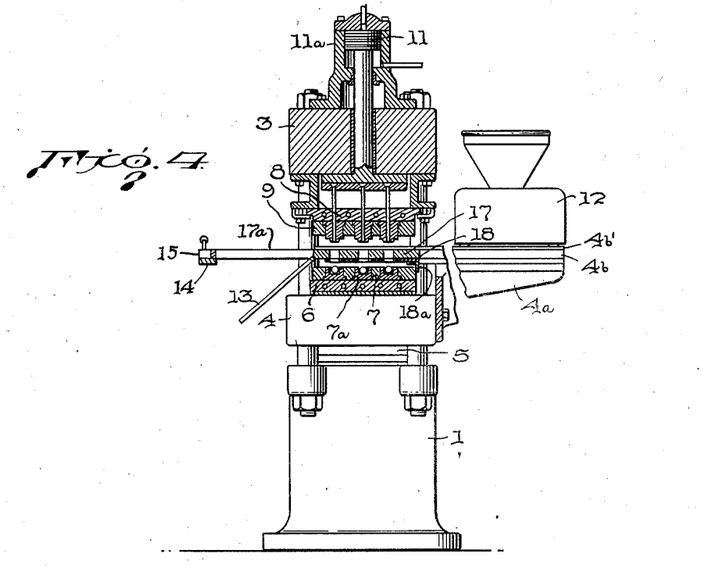
Figure 4 is a side elevational view, partly in section, showing the exploring device mounted on a movable loading board or device of the press.

In Figure 4 I have shown the checking switches or feeler devices applied to a press of the type in which both the upper and lower platens remain within the press and a reciprocative loading board is employed to transfer preforms or charges of loading material from the loading device 12 to the cavities in the die plate 7. In this arrangement, the parallel rails or bars 4b mounted on bracket 4a serve to guide the movement of a loading board 17 which is shifted by any suitable means from the position shown in Figure 4 into loading position under the loading device 12. The loading board 17 is of well known construction having a plurality of holes formed therein for receiving preforms or charges of molding material, the holes being arranged with the same spacing as the die cavities in plate 7. A perforated feeding or bottom plate 18 is carried on the lower face of loading board 17 and is normally urged by suitable biasing means into a position where solid portions of the plate cover the holes in loading board 17, but when the board is moved towards the feeding position where the holes in the feeding plate are directly above the cavities in the die plate, a finger or extension 18a on feeding plate 18 engages the edge of the die plate or some other fixed part of the press and holds the feeding plate stationary while the loading board continues to move until it reaches the final position shown in Figure 4 when the preforms are deposited in the die cavities.

The bar 14 carrying checking switches 15 is mounted on a frame 17a secured to loading board 17, and the checking switches operate as feeler devices for exploring the punches as the loading board moves from one position to the other and back again. The article receiving plate 13 is hinged to the front edge of loading board 17 and functions in the same manner as in Figure 1, except that during molding operation, the loading board 17 and the plate 13 are withdrawn from the press to the right, the loading board resting beneath the loading device 12 and the plate 13 being located between the loading device and the press. It will be understood that the loading device 12 is spaced from the press a distance sufficient to accommodate the plate 13 and frame 17a so that switches 15 are positioned on the right of the press during the molding stage of the cycle. The frame 17a may serve to support the board 17 for movement along rails 4b, and this frame also extends along the two sides and the front edge of plate 13. After the articles have been formed and the press opened, the loading board 17 is advanced until plate 13 is positioned below the punches. During this movement of frame 17a, the feeler devices 15 explore the punches for the presence of molded articles and if any are missing, the press will be stopped. When plate 13 comes into position below the punches, piston 11 is operated to dislodge the molded articles from the punches and deposit them on the plate 13, after which the loading board is moved further to the left and into the feeding position shown in Figure 4 where the molded articles are discharged from the plate 13, and the die cavities are refilled. When the loading board is withdrawn from the press, the feeler devices 15 check for the absence of molded articles on the punches, and will stop the press if any are present, the operation being the same as described above in connection with Figures 1, 2 and 3.

Figure 5:
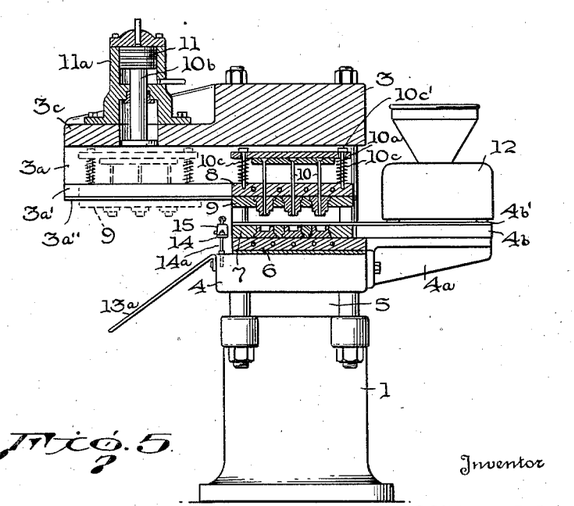
Figure 5 is a vertical side elevational view, partly in section, showing the exploring device mounted on the lower platen support of a moulding press in which the punch plate is mounted for movement outside of the press for ejection of the molded articles.
Figure 5A:
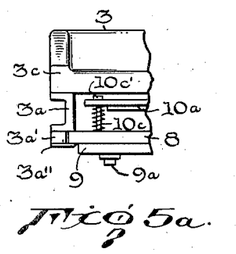
Figure 5a is a fragmentary side view of Figure 5 showing the manner of mounting the punch plate for sliding movement.

In Figure 5 I have shown the checking switches applied to a molding press of the type wherein the upper platen carrying the punch plate is moved out of the press for ejection of the molded articles, and the checking switches are mounted on a fixed part of the press. Elements corresponding to similar elements in Figures 1 to 3 are represented by the same reference characters. In this arrangement the die plate 7 is mounted for movement out of the press and into loading position under the loading device 12 in the same manner as in Figure 1, although the die plate could remain in the press and a movable loading board like that shown in Figure 4 could be employed.

In Figure 5 the upper platen 8 carrying the punch plate 9 and ejector pins 10 is mounted to be moved out of the press in a direction opposite to the direction of movement of the die plate 7. For this purpose, the channel bars 3a and 3b are arranged parallel to the bars 4b, and a pair of guiding bars 3a'—3b' are attached to the lower face of channel bars 3a—3b and serve as lateral guides for platen 8. Suitable strips 3a''—3b'' are secured to the lower faces of bars 3a'—3b' and serve to support the platen 8 in its sliding movement. As shown in Figure 5, the platen 8 and the attached elements are movable from the molding position shown in solid lines to the ejecting position shown in dotted lines, and vice versa.

The ejecting piston-cylinder combination 11—11a, instead of being mounted directly above the press is mounted on an extension 3c of crosshead 3, and the ejecting head 10a carrying ejecting pins 10 is not carried by the piston rod 10b, but is supported upon suitable biasing springs 10c, and the upward movement is limited by the heads of suitable guiding bolts 10c'. The lower end of piston rod 10b is normally retracted out of the path of the ejecting head 10a but is in position to operate the ejecting pins when the punch plate 9 is in the ejecting position shown in the dotted lines in Figure 5. A deflecting plate 13a may be provided immediately below the ejecting position of the punch plate for the purpose of deflecting the molded articles into a suitable container, but the deflecting plate may be omitted and the container may be placed immediately below the ejecting position of the punch plate.

The bar 14 carrying the checking switches 15 in Figure 5 is supported on suitable threaded rods 14a secured to movable crosshead 4. The vertical position of bar 14 is adjusted so that with crosshead 4 in its open position, the checking switches are at the proper elevation to explore the punches carried by plate 9 as this plate moves from within the press to the ejecting position and from the ejecting position back into the press. On the outward movement of the punch plate, the switches check the punches for the presence of a molded article on each punch, and on the return movement the switches check for the absence of molded articles on the punches.

Figure 6:
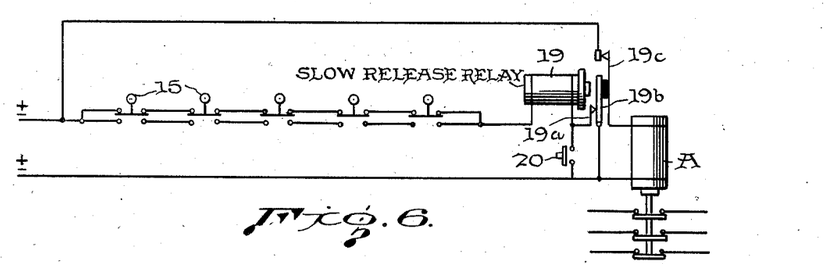
Figure 6 is a wiring diagram showing a modified form of stopping device operated by the same type of exploring device used in Figure 3.

In Figure 6 is shown a modified form of checking device which uses the same type of checking switch as in Figure 3 but does not use the same storage relay. In this arrangement, the checking switches 15 are connected in series in the same manner as in Figure 3 except that the connections to the last switch in the series, instead of going to separate magnets, are connected to the winding of relay 19 which is of a slow-release type. Preferably, the time of release should be adjustable. The circuit through the winding of relay 19 is completed through contact 19a which is held closed by the relay armature 19b when the relay is energized. It will thus be seen that the energizing circuit of relay 19 may be completed by the switches 15 in either the upper position or the lower position of these switches, but all switches must occupy the same position. Also, if any one switch remains in a different position from another switch for a time interval longer than the time required for the release of relay 19, the energizing circuit of the relay will be opened and cannot be closed again except by operation of the push-button switch 20 which is arranged to bridge the contacts 19a—19b of relay 19. The circuit of the main power switch A is completed through contact 19c on relay 19 when this relay is energized.

Operation of Figure 6 is as follows: The time delay in release of relay 19 is sufficiently long so that the relay will not be released within the time required for the switches 15 to move from the upper position to the lower position, and vice versa. This will prevent release of relay 19 when all of the switches 15 are operated downwardly by a complete set of articles in any given row. The relay will not be released when all switches are released and move upwardly simultaneously. If one or more articles should be missing from the row, then the relay 19 will have time to release its armature and the release of the relay causes release of power switch A, thus stopping the press. It will be understood that the rate of scanning the punches is adjusted so that the time required for the feeler wheel of a checking switch to pass over a molded article is longer than the delay period of relay 19. I prefer to use the "microswitch" type of switch for the checking switches 15 in order to reduce the time required for movement of the switch element from one position to the other, although this type of switch is not essential.

Figure 7:
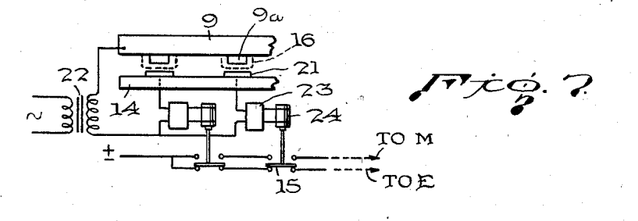
Figure 7 shows a modified arrangement using an electrical type of feeler element.

In Figure 7 I have shown a modification in which the feeler elements do not have the actual physical contact with the molded articles, but constitute electrical feelers which detect or sense the presence of a molded article electrically. In this arrangement the bar 14 is formed of insulating material and carries a number of metallic feeler pieces 21, one piece being provided for each column of punches; and the bar 14 is positioned so that during relative movement of the bar with respect to the mold plate 9, the pieces 21 do not come in contact with the molded caps 16 but pass beneath these caps with small clearance. Each feeler piece 21 and the corresponding punch 9a constitutes an electrical condenser, the capacity of which is one value without a cap on the punch and is of a greater value when the cap is present due to the high dielectric constant of the molding material from which the caps are formed. This change in value of the condenser is utilized to operate the checking switches by connecting each condenser in circuit with a source of alternating current represented by the transformer 22, and each circuit includes a sensitive amplifying device 23 which energizes a relay 24 for operating the switch 15.

The operation of Figure 7 is as follows: When the bar 14 is displaced from the plate 9, the relays 24 are deenergized and the switches 15 are positioned on their lower contacts. In this case the lower circuit of the switches leads to the stepping magnet E of Figure 3. When the bar 14 is positioned beneath a row of punches having caps thereon, the increase in the capacity of the condenser elements will cause operation of the relays 24 to shift the switches 15 to the upper positions and operate the releasing magnet M of Figure 3. If any cap should be missing from one or more punches in the row, the corresponding relays will remain unoperated, and the press will be stopped. It is obvious that the arrangement of Figure 7 may be employed in the checking arrangement illustrated in Figure 6.

Figures 8, 9:
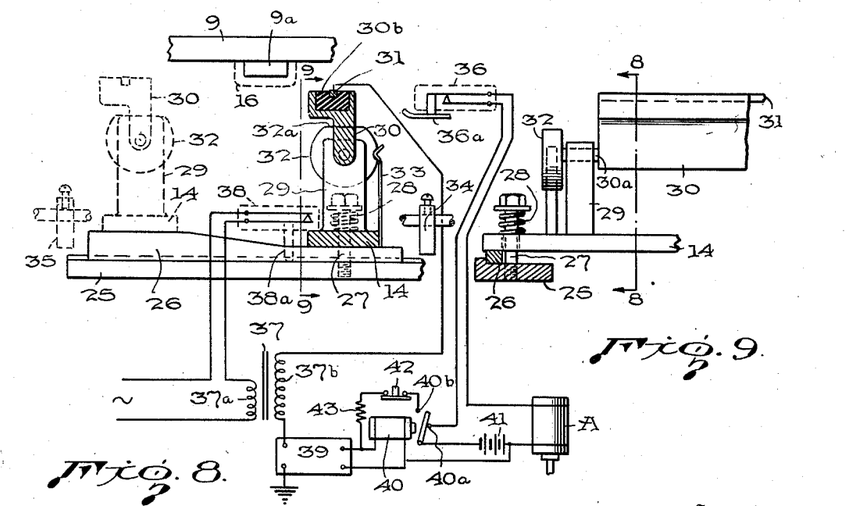
Figure 8 shows the details of mounting another type of exploring device which uses an electrical feeler element for one checking operation and a mechanical feeler for the second checking operation.
Figure 9 is a view of Figure 8 taken along the line 9—9.

Figure 8 shows another form of checking device in which the punches are explored electrically on one checking operation and are explored mechanically on the second checking operation. This figure shows the arrangement for mounting one end of the bar 14 which carries the exploring elements, and the other end of the bar is provided with a similar mounting arrangement. Figure 8 is a sectional view taken along the line 8—8 of Figure 9. The exploring device is mounted upon a pair of rails 25, only one of which is shown in Figures 8 and 9. These rails are arranged on opposite sides of the lower mold plate, and in the case of Figure 1 they would be movable with the mold plate 7. In the case of Figure 4 they would form a part of the frame 17a, and in the case of Figure 5 they would be mounted on the crosshead 4. In all cases these rails would support the bar 14 in generally the same position as in Figures 1, 4 and 5.

Bar 14 is mounted upon the rails 25 by means of an interposed wedge-shaped cam piece 26 which is thin at the right end and thick at the left end in Figure 8. The bar 14 is maintained in position on rails 25 by means of a pair of pins 27 which are secured to the rails 25 and extend upwardly through holes formed in the bar 14. These pins are provided with nuts at the upper ends and suitable springs 28 are arranged on the pins below the nuts and serve to resiliently press the bar 14 into contact with the cam piece 26.

A pair of vertical standards 29 are provided on the bar 14 at opposite ends thereof, and a checking bar 30 is pivotally supported on the standards by means of trunnions 30a on an axis passing through the lower edge thereof. The upper edge of the bar is relatively wide and is provided with a slot or groove in which a smaller metallic bar 31 is insulatingly mounted by means of insulating material 30b.

A circular cam piece 32 is secured to one end of trunnion 30a and is provided with a flattened upper portion 32a, this cam piece being movable with the checking bar 30 about its pivotal axis. The bar 30 and the cam piece 32 are normally maintained in the position shown in Figure 8 by means of any suitable releasable latch represented by a spring 33 having a detent which engages a notch formed in the edge of cam piece 32. This arrangement is such that when a lateral force is exerted on the upper edge of bar 30, the bar may be tilted from its normal position, and will remain in the tilted position by reason of the frictional engagement of the spring 33 against the periphery of cam piece 32.

As shown in Figure 8, the exploring device is mounted so that with the bar 14 resting on the low portion of the cam piece 26, the checking bars 30 and 31 will freely pass beneath the molded article 16 carried on punches 9a without touching the articles, but when the bar 14 is resting on the thick portion of cam piece 26, as shown in dotted lines in Figure 8, the upper edge of the bar 30 will engage any molded article which is carried by the punch 9a but will not engage the punch itself. The arrangement is such that one checking operation is performed with the bar on the low part of cam piece 26, and the second checking operation is performed after the cam piece 26 has been moved so that the bar 14 rests upon the high part of the cam piece. Shifting of the cam piece may be accomplished in various ways; such as by providing an adjustable stop 34 arranged to engage the right end of the cam piece 26 near the end of one checking operation to shift the cam piece so that the bar 14 will rest on the low part of the cam, and a similar adjustable stop 35 is provided to engage the left end of the cam 26 near the end of the second checking operation to shift the cam piece so that the bar 14 will rest upon the high part of the cam. Where the rails 25 are movable with respect to the punch plate 9, the stops 34 and 35 will be mounted on a fixed part of the press, but where the rails are stationary, and the plate 9 moves with respect to the exploring device, the stops 34 and 35 will be mounted to move with the mold plate.

If it be assumed that the plate 9 is stationary and the exploring device moves with respect to the plate, then the position of the parts as shown in Figure 8 is correct for movement of the exploring device to the left. During such movement, the exploring bars 30 and 31 will pass freely beneath the caps 16 without touching any of them, and if any are missing, the press will be stopped by means of an electrical device connected with the bar 31 as will be explained hereinafter. After the exploring device passes beyond the last row of punches, the cam piece 26 comes into engagement with stop 35, and stops the movement of the cam piece, while continued movement of rail 25 causes the bar 14 to ride up to the high part of the cam piece, after which the direction of movement of the rails 25 is reversed for the second checking operation. It will be understood that after the exploring device completes the first checking operation, the ejecting mechanism of the press is operated to eject molded articles from the punches. During the second checking operation when the rails 25 are moving to the right, the checking bar 30 is elevated to a position shown in dotted lines in Figure 8 such that the upper edge of the bar will engage any molded article which remains on any of the punches 9a, and such engagement will cause the bar to be tilted from its normal position so that the flattened portion 32a of the cam piece 32 moves out of a horizontal plane. When the checking device moves to the right beyond the last row of punches, the cam piece 32 passes beneath the operating finger 36a of a normally closed switch 36 which is mounted on a fixed part of the press. If the cam piece 32 is in its normal position, the flattened portion 32a does not engage the switch operator 36a, but if the bar 30 has been tilted as explained above, the cam piece 32 will engage the part 36a and open the switch 36, thereby interrupting the energizing circuit of the main power switch A.

The arrangement for stopping the press when a molded article is missing from one of the punches during the first checking operation involves an arrangement operating on the same principle as an insulation tester. This involves a transformer 37 having a primary winding 37a connected to a source of current of commercial frequency through a switch 38. This switch is controlled by some moving part of the press so that the transformer is energized during the first checking operation but is de-energized during the second checking operation. In the arrangement shown in Figure 8, this is accomplished by mounting the switch 38 on the bar 14 in a position such that the normally open contacts of the switch are closed by engagement of the switch-operating plunger 38a with the upper face of rail 25 when the bar 14 is resting on the low part of cam piece 26, but the switch contacts are allowed to open when the bar 14 is resting on the high part of the cam 26.

One terminal of the high voltage secondary winding 37b of transformer 37 is connected to ground through a suitable amplifier 39, and the other terminal is connected to the insulated exploring bar 31. A relay 40 is connected to the output of amplifier 39, and the armature of this relay normally closes a back contact 40a which is included in the circuit of power switch A in series with switch 36 and a source of current 41.

The voltage of secondary winding 37b is low enough to prevent any sparking between the insulated bar 31 and any other part of the press when the bar is not positioned beneath a row of punches, but the voltage is sufficient to cause sparking between the bar 31 and any punch which does not have a cap thereon when the bar is located beneath a row of punches. Also, the presence of a cap on any punch will prevent the passage of a spark or discharge between the bar 31 and the punch. Accordingly, during the first checking operation, if all caps are present on the punches, no spark will pass from the bar 31 and relay 40 will remain de-energized. If, however, a cap is missing from one or more punches, a spark or discharge will pass from the bar 31 to the first empty punch, and relay 40 will be energized and thereby pull up its armature and interrupt the circuit of switch A at contact 40a. When the relay 40 is energized, the armature closes a front contact 40b to complete a holding circuit for the relay from the source 41 through a normally closed pushbutton switch 42 and a limiting resistance 43. This holding circuit prevents reclosing of the circuit of switch A until the cause of the improper operation of the press has been removed, and the relay may be restored to normal condition by pressing the pushbutton 42.

While the single insulated bar 31 is employed to explore all of the punches in a given row, the different linear sections of this bar associated with each punch are the equivalent of a plurality of individual exploring elements for the corresponding punches. The same is true of the mechanical checking bar 30. By securely imbedding the lower edge of the bar 31 in the insulating material 30b, and by extending the upper edge of this bar above the upper edge of bar 30, the bar 31 may perform both the electrical and mechanical exploring operations.

While the checking devices disclosed herein find their greatest utility in connection with a press having the mold elements arranged in a plurality of parallel rows, it is obvious that these devices will be completely operative where the mold elements are arranged in a single row. Also, the elements need not be arranged in a straight line, but they may be arranged in a staggered row or similar extended array, and the exploring elements would be arranged in a corresponding array so that all of the exploring elements would engage all of the mold elements in the array simultaneously.

As will be seen from the various modifications illustrated in the drawing and described above, my invention is not limited to a particular construction but may have various embodiments, both as to the checking device and the arrangement of the press for utilizing the checking device.

I claim:

1. A device for checking the operation of a molding press having a plurality of mold elements arranged in parallel columns and rows, said device comprising a plurality of feeler elements arranged in a row parallel with the rows of mold elements, one feeler being arranged in line with each column of mold elements, means for producing relative movement between said mold elements and said feelers in a direction parallel with said columns, a relay for stopping said press, means controlled by any of said feelers upon detecting a molded article carried on any of said mold elements tending to operate said relay to stop said press, and means dependent upon the joint control of all of said feeler elements upon detecting molded articles carried by all of the mold elements in any given row for preventing operation of said stopping relay.

2. A device for checking the operation of a molding press having a plurality of mold elements arranged in parallel columns and rows, said device comprising a plurality of feeler elements arranged in a row parallel with the rows of mold elements, one feeler being arranged in line with each column of mold elements, means for producing relative movement between said mold elements and said feelers in a direction parallel with said columns, means for stopping said press comprising a storage relay having a stepping magnet and a releasing magnet, said relay requiring two successive stepping impulses for stopping said press, means for normally supplying a stepping current to said relay, means controlled by the operation of any of said feelers upon detecting a molded article carried on any of said mold elements for interrupting said stepping current, and means controlled by the simultaneous operation of all of said feelers upon detecting molded articles carried by all of the mold elements in a given row for supplying a releasing impulse to said relay.

3. A device according to claim 2 wherein the circuit for supplying current to the stepping magnet of the storage relay includes a plurality of normally closed switch elements connected in serial circuit relation, and the circuit for supplying current to said releasing magnet includes a plurality of normally open switch elements connected in serial circuit relation, and wherein each of said feeler devices is arranged upon detecting a molded article to open one of said normally closed switches and to close one of said normally open switches.

4. A device for checking the operation of a molding press having a plurality of mold elements arranged in a row, said device comprising a plurality of feeler elements arranged in a row parallel with the row of mold elements, one feeler being arranged in line with each mold element in said row, means for producing relative movement between said mold elements and said feelers to cause said feeler elements to traverse the row of mold elements, first in one direction and then in the other, a relay for stopping said press, means controlled by the operation of any of said feelers upon detecting a molded article carried on any of said mold elements during the first traverse of said feelers tending to operate said relay to stop said press, means controlled by the simultaneous operation of all of said feeler elements upon detecting molded articles carried by all of the mold elements in said row for preventing operation of said stopping relay, means for ejecting the molded articles from said mold elements following the first traverse of said feeler elements, and means controlled by the operation of any one of said feeler elements during the second traverse of said feeler elements for operating said relay to stop said press.

5. A device for checking the operation of a power driven machine comprising, in combination, a relay for stopping the operation of said machine, a storage relay for controlling the operation of said stopping relay, said storage relay having a stepping magnet and a releasing magnet and requiring two successive stepping impulses for operating said stopping relay, a circuit for normally energizing said stepping magnet including a plurality of normally closed switch elements connected in serial circuit relation, a circuit for energizing said releasing magnet including a plurality of normally open switch contacts connected in serial circuit relation, and a plurality of feeler elements responsive to the condition of operation of said machine, each feeler element being arranged upon operation to open one of said normally closed switch contacts and to close one of said normally open switch contacts.

6. A device for checking the operation of a power driven machine comprising, in combination, a relay for stopping the operation of said machine, a storage relay for controlling the operation of said stopping relay, said storage relay having a stepping magnet and a releasing magnet and requiring two successive stepping impulses for operating said stopping relay to a position for stopping said machine, a circuit for normally energizing said stepping magnet, a feeler element responsive to the condition of operation of said machine, and means controlled by operation of said feeler element for opening the circuit of said stopping magnet and closing the circuit of said releasing magnet.

7. In combination, a molding press having a plurality of mold elements arranged in parallel columns and rows, a checking device comprising a plurality of feeler elements arranged in a single row parallel with the rows of mold elements, one feeler being arranged in line with each column of mold elements and serving to detect molded articles carried by said mold elements, means for producing relative movement between said mold elements and said feelers to cause said feeler elements to traverse the columns of mold elements first in one direction and then in the other, control means responsive to the operation of less than all of said feelers in passing a row of mold elements during the first traverse of said feelers to stop said press, means for ejecting the molded articles from said mold elements following the first traverse of said feeler elements, and said control means being effective upon the operation of any one of said feeler elements during the second traverse of said feeler elements to stop said press.

8. In combination, a molding press having upper and lower mold plates each carrying a plurality of mold elements, one of said mold plates being movable in and out of said press, an exploring device mounted on and being movable with said movable mold plate for exploring the mold elements carried by the opposite mold plate, and means controlled by said exploring device on the outward movement of said movable plate for stopping said press if a molded article is missing from any of the mold elements carried by said opposite mold plate, said means being controlled by said exploring device on the inward movement of said movable plate for stopping said press if a molded article remains on any of the mold elements carried by said opposite plate.

9. In combination, a molding press having upper and lower mold plates each carrying a plurality of mold elements, arranged in parallel columns and rows, means for moving the lower mold plate out of the press and back into the press, an exploring device mounted on and being movable with said lower mold plate, said exploring device comprising a plurality of feeler elements arranged in a single row parallel with the rows of mold elements, one feeler for each column of mold elements, said feelers being positioned to traverse the columns of mold elements carried by the upper mold plate and being operated by molded articles carried thereon, and control means responsive to the operation of less than all of said feelers in passing a row of mold elements during the outward movement of said lower plate to stop said press, said control means being effective upon the operation of any one of said feeler elements during the return movement of said lower plate to stop said press.

10. In combination, a molding press having a plurality of mold elements arranged in an extended array, a checking device comprising a plurality of feeler elements arranged in a corresponding array parallel with the array of mold elements, one feeler being arranged in line with each mold element in said extended array, means for producing relative movement between said mold elements and said feelers to cause said feeler elements to traverse the array of mold elements first in one direction and then in the other, control means responsive to the operation of less than all of said feelers in passing said array of mold elements during the first traverse of said feelers to stop said press, means for ejecting the molded articles from said mold elements following the first traverse of said feeler elements, and said control means being effective upon the operation of any one of said feeler elements during the second traverse of said feeler elements to stop said press.

11. A device for checking the operation of a power driven machine comprising, in combination, a storage relay having a movable element operable to a position for stopping said machine, said storage relay having a stepping magnet and a releasing magnet and requiring two successive stepping impulses for operating said movable element to stopping position, a circuit for normally energizing said stepping magnet including a plurality of normally closed switch elements connected in serial circuit relation, a circuit for energizing said releasing magnet including a plurality of normally open switch contacts connected in serial circuit relation, and a plurality of movable feeler elements responsive to the condition of operation of said machine, each feeler element being arranged upon operation to open one of said normally closed switch contacts and to close one of said normally open switch contacts.

12. In combination, a molding press having a mold plate carrying a plurality of mold elements, a carriage mounted to be movable in and out of said press adjacent said mold plate, an exploring device mounted on and being movable with said carriage for exploring the mold elements carried by said mold plate, and means controlled by said exploring device during one direction of movement of said carriage for stopping said press if a molded article is missing from any of the mold elements carried by said mold plate, said means being controlled by said exploring device on the opposite direction of movement of said carriage for stopping said press if a molded article remains on any of the mold elements carried by said mold plate.

13. In combination, a molding press having an upper mold plate carrying a plurality of punches which retain molded articles thereon after each molding cycle, a lower mold plate having a corresponding plurality of die cavities, one of said mold plates being fixed against movement transversely of the press while the other mold plate is movable out of the press transversely thereof, an exploring device mounted in fixed relation with respect to said lower mold plate and in a position to explore the punches on the upper mold plate when said movable plate is moved transversely of said press, and a stopping device controlled by said exploring device during the outward movement of said movable mold plate for stopping said press if a molded article is missing from any of the punches, and means for ejecting the molded articles from said punches, said stopping device being controlled by said exploring device on the inward movement of said movable plate for stopping said press if a molded article remains on any of said punches.

14. A device for checking the operation of a power driven machine comprising, in combination, means for maintaining the machine in operation including a pair of closed maintaining contacts, a plurality of exploring devices each including a switch having a pair of upper contacts, a pair of lower contacts, and a movable switch element for selectively bridging either pair of contacts, the upper contacts of said switches being connected in serial circuit relation in one circuit and the lower contacts being connected in serial circuit relation in another circuit, and relay means controlled by said two circuits and serving to continue said maintaining contacts in closed position so long as said movable switch elements are operated simultaneously from one pair of contacts to another, said relay means being operative upon the movement of less than all of said movable switch elements from one position to the other to interrupt said maintaining contacts.

15. A device for checking the operation of a power driven machine comprising, in combination, a plurality of exploring devices each including a switch having a pair of upper contacts, a pair of lower contacts, and a movable bridging element for selectively bridging either pair of contacts, a relay of the slow-release type, a circuit for energizing the winding of said relay through the upper contacts of said exploring switches connected in serial circuit relation, and a second energizing circuit for the winding of said relay including the lower contacts of said exploring switches connected in serial circuit relation, whereby operation of all of said switch elements from one bridging position to the other simultaneously and within a period less than the time delay period of said relay will prevent the dropout of said relay.

16. A checking device according to claim 15 in which the energizing circuits of said slow-release relay are completed by contacts which are held in closed position by the armature of said relay when the relay is energized, whereby upon release of said armature the relay cannot be re-energized by opration of said checking switches.

WILLIAM STRAUSS.

REFERENCES CITED

The following references are of record in the file of this patent:

UNITED STATES PATENTS

| Number | Name | Date |
|---|---|---|
| 2,257,732 | Clark, Jr. | Oct. 7, 1941 |
| 2,371,195 | Strauss | Mar. 13, 1945 |
| 2,350,319 | Strauss | May 30, 1944 |
| 2,356,266 | Ogilvie et al. | Aug. 22, 1944 |